Sept. 24, 1940.　　　A. F. HOWE ET AL　　　2,215,832
LIQUID METER
Filed Oct. 13, 1937　　　2 Sheets-Sheet 1

Inventors
Andrew F. Howe
Robert A. Bagnell
by Rippey & Cassidy
Their Attorneys

Sept. 24, 1940.　　　A. F. HOWE ET AL　　　2,215,832
LIQUID METER
Filed Oct. 13, 1937　　　2 Sheets-Sheet 2

Inventors
Andrew F. Howe
Robert A. Bagnell
by Rippey & Cassidy
Their Attorneys

Patented Sept. 24, 1940

2,215,832

UNITED STATES PATENT OFFICE 2,215,832

LIQUID METER

Andrew F. Howe, University City, and Robert A. Bagnell, Ladue Village, Mo.

Application October 13, 1937, Serial No. 168,724

4 Claims. (Cl. 73—251)

This invention relates to liquid meters.

Objects of the invention are to provide an improved liquid meter having a cylinder receiving liquid from a pump at opposite sides of a piston mounted in the cylinder, whereby the piston will be reciprocated by pressure applied to opposite sides thereof by the liquid driven by the pump, and will operate a valve controlling flow of liquid to opposite sides of the cylinder; to provide a novel and efficient valve and valve mounting with connections for rotating the valve by the piston to control flow of liquid into the cylinder and also to control flow of liquid from the cylinder to a carburetor or other point of delivery; to provide mechanism operated by the piston for registering or indicating the amount of liquid contained in the tank or source of supply and the amount of liquid that has been removed from said tank or source of supply; and to provide mechanism operated by the liquid in the tank or source of supply to indicate upon the same register the amount of liquid contained in the tank or source of supply.

Another object of the invention is to provide an improved register embodying these devices and mechanisms and adapted specially for use in connection with a gasoline engine or motor for indicating the amount of gasoline taken from the tank and passing to the carburetor.

Other objects of the invention will be apparent from the following description, reference being made to the annexed drawings, in which—

Figures 1, 3:
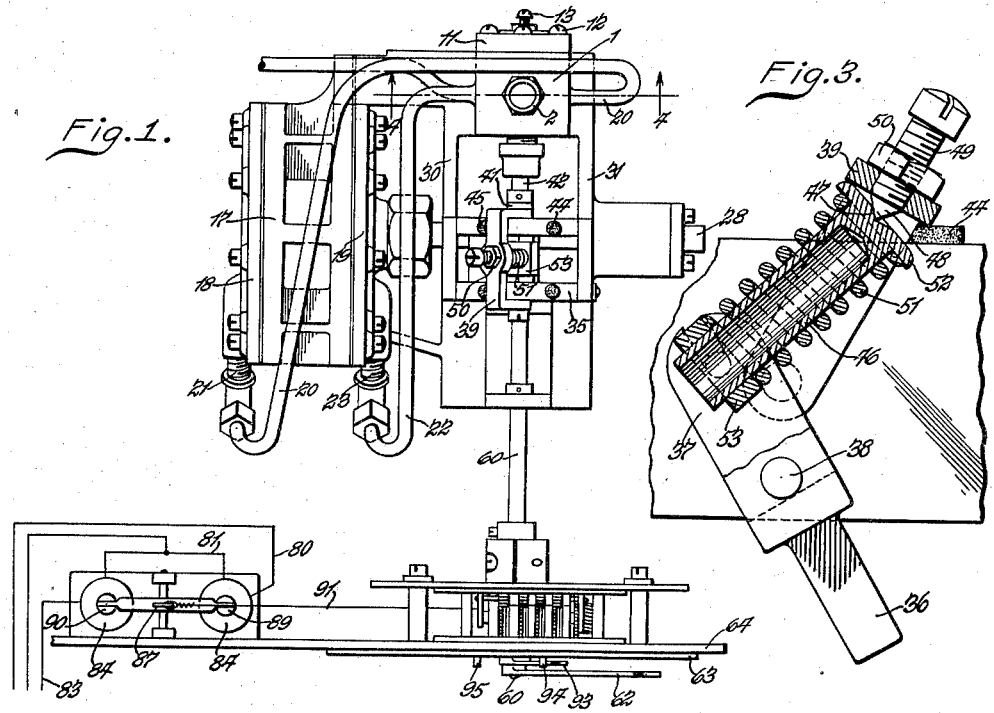
Fig. 1 is a plan view of the invention.
Fig. 3 is an enlarged sectional view of the devices operated by the piston for operating the valve to control admission of gasoline or other liquid into opposite ends of the cylinder, and also to control discharge of the gasoline or other liquid from the opposite ends of the cylinder.

Gasoline from the usual tank is forced by a pump (not shown) into a valve housing 1 through a pipe connection 2 opening into a passage 3 in the valve housing. The valve housing is formed with a tapered cavity 4 (Fig. 6) into which the passage 3, and also the passages 5, 6, 7 and 8, open. The passages 7 and 8 open into a passage 9 in the valve housing.

A tapered valve 10 is mounted in the cavity 4. The body of the valve 10 is of less length than the cavity 4 and the walls of the cavity and the valve body are smoothly ground. A wall 11 closes the open end of the cavity 4 and is attached to the valve housing 1 by removable and replaceable screws 12. This wall 11 has a portion telescoping into the cavity 4 but spaced substantially from the end of the valve body. A screw 13 extends through the plate 11 and has a point 14 engaging against the exact center of the outer or larger end of the valve body and functioning as a pivot against which the larger end of the valve body turns, and also functioning as a device for forcing the valve body to its proper position in the valve housing. In using the invention for metering gasoline, it has been found necessary to make the parts in this form and to mount them in this manner in order to prevent leakage of the gasoline along and about the valve. However, by making the valve body and its seat in tapered form and holding the valve body in proper leakproof relationship to its seat by the pivot device shown and described, leakage of the gasoline about the valve is prevented.

Figure 4:
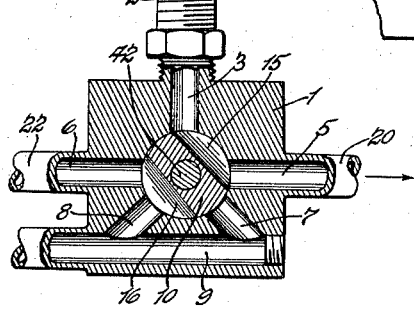
Fig. 4 is a cross-sectional view of the valve and valve housing.

This valve body has on one side a groove 15 and on its diametrically opposite side a similar groove 16. The valve body may be rocked to place the groove 15 in position to establish communication between the passages 3 and 5; to place the groove 16 in position to establish communication between the passages 6 and 8; and to close the passage 7, as shown in Fig. 4. Also, the valve may be rocked to another position to place the groove 15 in position to establish communication between the passages 5 and 7; to place the groove 16 in position to establish communication between the passages 3 and 6; and to close the passage 8.

Figure 5:
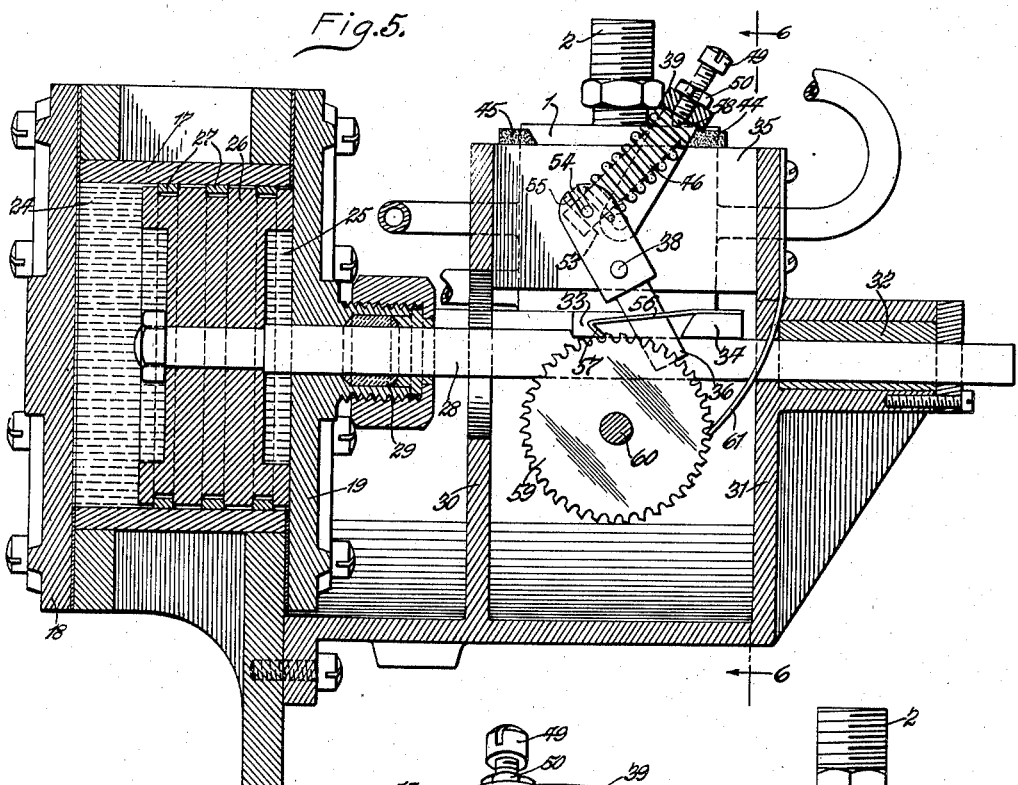
Fig. 5 is an enlarged sectional view of the meter and the mechanism operated thereby.

The invention comprises a cylinder 17 provided with a detachable outer end wall 18 and a detachable inner end wall 19. From the passage 5 a tube 20 leads to connection with a fitting 21 opening through the end wall 18 into one end of the cylinder 17. From the passage 6 a tube 22 leads to connection with a fitting 23 opening through the end wall 19 into the opposite end of the cylinder 17. Thus, when the valve is in the position shown in Fig. 4, gasoline will be admitted into the space 24 in the cylinder 17 and, when the valve is turned to the other position above described, communication from the passage 3 to the passage 5 is closed and the passage 3 is placed in communication with the passage 6 and gasoline will be admitted into the space 25 at the opposite end of the cylinder 17 (Fig. 5).

A piston 26 is mounted for reciprocation in the cylinder 17 and is provided with leakproof packing and sealing devices 27. The ends of this piston are formed with recesses, as shown in Fig. 5, so that the openings from the tubes 20 and 22 into the opposite ends of the cylinder are never closed by the piston. This is because the fittings 21 and 23 open through the end walls 18 and 19 opposite these recesses in the piston.

Figure 6:
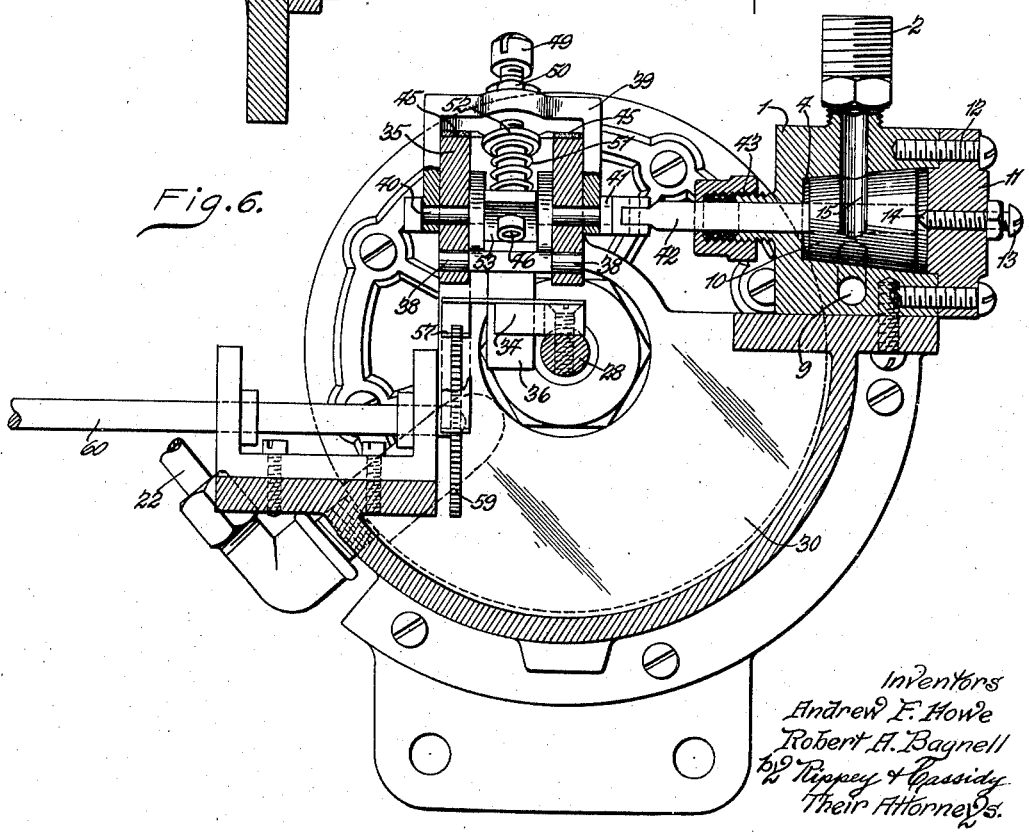
Fig. 6 is a cross-sectional view on the line 6—6 of Fig. 5.

A piston rod 28 extends through a leakproof bearing and sealing device 29 on the wall 19 and is attached to the center of the piston 26. This piston rod extends through a frame comprising the parts 30 and 31, and has its outer end mounted for sliding movements in a supporting bearing 32. A pair of arms 33 and 34 are attached to the piston rod 28 between the frame parts 30 and 31. A frame 35 is attached between the upper portions of the frame parts 30 and 31 above the piston rod 28. A bifurcated lever comprising a depending arm 36 and two upwardly extended arms 37 is mounted between the sides of the frame 35 and is supported by pivots 38 extending into the sides of said frame (Fig. 6). The depending arm 36 extends between the arms 33 and 34, so that, when the piston rod 28 is reciprocated, the bifurcated lever will be oscillated on its pivots 38, through an extent of about 60° more or less, although the extent of oscillation may be varied as desired.

A yoke 39 straddles the frame 35 and has one arm mounted on a pivot 40 and its opposite arm attached to a rocking device 41 pivoted in the opposite side of the frame 35 from the pivot 40 and in axial alinement therewith. The rocking device 41 is pivotally connected with a rod 42 extending axially into and attached to the valve body 10. The rod 42 extends through a leakproof bearing 43 in connection with the valve housing 1. This yoke is capable of swinging through an extent of about 60° from an elastic stop 44 to an elastic stop 45, which stops are attached to the frame 35.

A tubular member 46 has a conical bearing cavity 47 in its upper end engaging the bearing point 48 of an adjusting screw 49 mounted in the yoke 39 midway between the sides of the frame 35. A lock nut 50 on the screw 49 engages the yoke 39 and holds the screw 49 in its proper adjustment.

The member 46 extends between the arms 37 of the bifurcated lever and is encircled by a coiled expansion spring 51, the upper end of which presses against a circumferential flange 52 on the member 46 and the lower end of which presses against an abutment 53 mounted for sliding movements along the member 46 and having laterally extended lugs 54 engaging in slots 55 in the arms 37 of the bifurcated lever.

A leaf spring 56 attached to the arm 34 has a rebent portion 57 engaging the teeth of a ratchet wheel 59 attached to a shaft 60. By this arrangement the ratchet wheel 59 will be turned in a clockwise direction (Fig. 5) by reciprocation of the piston rod 28, counter-clockwise turning movement of said pinion being prevented by an escapement spring 61 having one end attached to the frame side 31 and the opposite end engaging the teeth of the ratchet wheel 59. Thus, movement of the piston rod 28 in one direction will turn the ratchet wheel 59 and thereby the shaft 60 in a clockwise direction, while movement of the piston rod 28 in the opposite direction will leave the ratchet wheel 59 and the shaft 60 stationary.

Figure 2:
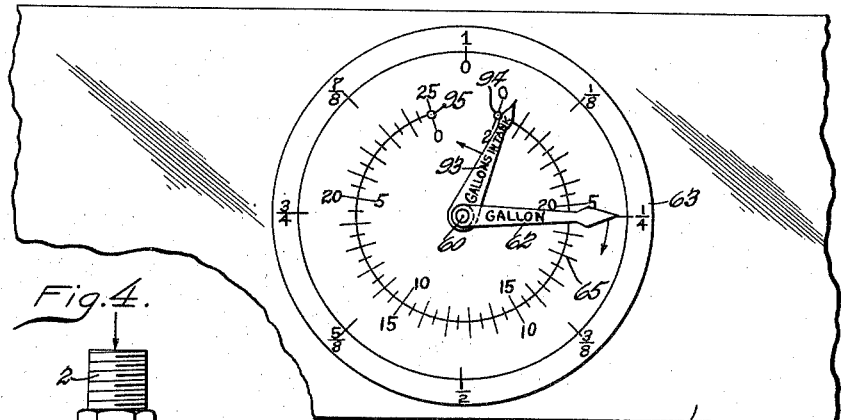
Fig. 2 is an elevation showing the register or dial device included in the invention.

The shaft 60 has a pointer 62 attached thereto and cooperating with a dial or register 63 mounted on the instrument board 64 of a motor vehicle or other support, as desired. The pointer 62 also operates across an annular dial 65 in a clockwise direction (Fig. 2). By cooperation with the dial 63 the pointer 62 indicates the proportionate amount of contents of the gasoline tank that have been withdrawn, and may also be read in connection with the dial 65 to indicate the gallonage of the tank that has been withdrawn.

Up to this point, the operation of the invention is as follows: When the engine is started, as is well known the pump taking gasoline from the tank is also started, and the operation of the pump will force gasoline through the connection 2 and the passage 3 and through one of the valve notches 15 or 16, and thence through one of the tubes 20 or 22, into one end of the cylinder 17. The parts are coordinated and arranged so that, when the piston closely approaches either end of the cylinder, the yoke 39 will be thrown from one angular position to the other, thereby immediately turning the valve 10 to change the effective positions of the notches 15 and 16. In the position shown in Fig. 4, gasoline is being forced into the end space 24 of the cylinder. As shown in Fig. 5, the piston must now move in the opposite direction and it is at this time, when the piston reaches the position shown in Fig. 5, that the yoke 39 is operated to turn the valve from the position shown in Fig. 4 to the position in which the notch 16 establishes communication between the passages 3 and 6, closes communication between the passages 3 and 5, establishes communication between the passages 5 and 7, and closes the passage 8. This leaves the gasoline free to flow from the space 24 of the cylinder through the passage 5, the notch 15, and the passages 7 and 9, to the carburetor. As shown in Fig. 4, the valve is in position to permit flow of gasoline from the pump through the passage 3, the notch 15, the passage 5, the tube 20 and the fitting 21, into the space 24. But, as shown in Fig. 5, the parts are in position in which this adjustment is reversed, so as to permit flow of gasoline through the passage 3, the notch 16, the passage 6, the tube 22 and the fitting 23, into the space 25. These reversals of the position of the valve 10 are repeated automatically and incidentally to the operation of the piston 26 as and when said piston closely approaches each end of its stroke.

From the foregoing, it is believed that the principle and nature of the invention should be apparent; and, further, that the invention may be applied to various uses. While the shaft 60 is rotated only during the movement of the piston 26 in one direction, substantially accurate indications of the amount of gasoline withdrawn from the tank is afforded by the pointer 62 and its relationship to the dial 63. In actual use, the invention has been found to afford nearly precise indications.

We do not restrict ourselves unessentially, but what we claim and desire to secure by Letters Patent is:

1. In a liquid meter having a piston moved alternately in opposite directions by pressure of the liquid to be metered alternately against opposite sides thereof, and a piston rod reciprocated longitudinally by said piston; a stationary frame, a rock pivot supported by said frame, a yoke fixedly attached to said pivot for rocking the same, a rotary valve for controlling passage of liquid alternately to opposite sides of said piston, a stem projecting from said valve in axial alinement with and connected to said pivot for turning movements by said pivot, and mechanism within said frame operated by said piston rod for rocking said yoke and thereby said valve.

2. In a liquid meter having a piston moved alternately in opposite directions by pressure of the liquid to be metered alternately against opposite sides thereof, and a piston rod reciprocated longitudinally by said piston; a stationary frame, a rocking valve for controlling passage of liquid alternately to opposite sides of said piston, a stem projecting axially from said valve, a yoke fixedly attached to said valve stem at one side of said frame, a pivot at the opposite side of said frame in axial alinement with said valve stem supporting one side of said yoke, mechanism within said frame operated by said piston rod for rocking said yoke and thereby said valve to control passage of liquid alternately to opposite sides of said piston, and means operated by said piston rod for indicating the amount of liquid admitted to opposite sides of said piston as aforesaid.

3. In a liquid meter having a piston moved alternately in opposite directions by pressure of the liquid to be metered alternately against opposite sides thereof, and a piston rod reciprocated longitudinally by said piston; a stationary frame, a pivot supported at one side of said frame, a rocking valve beyond the opposite side of said frame for controlling passage of liquid alternately to opposite sides of said piston, a stem projecting from said valve in axial alinement with said pivot, a yoke extending across said frame and having one side supported by said pivot and the opposite side fixedly attached to said valve stem for rocking the same and thereby said valve, and mechanism between the sides of said frame operated by said piston rod for rocking said yoke and thereby said valve as aforesaid.

4. In a liquid meter having a piston moved alternately in opposite directions by pressure of the liquid to be metered alternately against opposite sides thereof, and a piston rod reciprocated longitudinally by said piston; a stationary frame, a pivot supported by one side of said frame, a rocking valve for controlling passage of liquid alternately to opposite sides of said piston and supported for rocking movements about an axis in alinement with the axis of said pivot, a yoke having one side supported on said pivot and its opposite side fixedly attached to said valve for rocking the same to control passage of liquid as aforesaid, mechanism operated by said piston within said frame for rocking said yoke and thereby said valve to control passage of liquid alternately to opposite sides of said piston, and a device operated by said rod indicating the amount of liquid admitted to opposite sides of said piston as aforesaid.

ANDREW F. HOWE.
ROBERT A. BAGNELL.